United States Patent [19]

Tanaka et al.

[11] Patent Number: 5,755,838
[45] Date of Patent: May 26, 1998

[54] COAL GASIFIER AND USING METHOD THEREOF

[75] Inventors: Sinji Tanaka, Juou-machi; Shuntaro Koyama, Hitachinaka; Masato Takagi, Koshigaya; Eiji Kida, Hiroshima; Fumiki Ueda, Ichihara; Tadayoshi Muramatsu, Tokyo, all of Japan

[73] Assignees: Hitachi, Ltd.; Babcock-Hitachi Kabushiki Kaisha, both of Tokyo, Japan

[21] Appl. No.: 772,578

[22] Filed: Dec. 26, 1996

Related U.S. Application Data

[63] Continuation of Ser. No. 418,450, Apr. 7, 1995, abandoned.

[30] Foreign Application Priority Data

Apr. 11, 1994 [JP] Japan ................................. 6-071789

[51] Int. Cl.[6] ................................................ C10J 3/68
[52] U.S. Cl. ........................... 48/77; 48/62 R; 48/68; 48/69; 48/87; 48/128; 48/DIG. 2
[58] Field of Search ................................. 48/62 R, 67, 68, 48/69, 76, 77, 87, 128, DIG. 2; 122/7 R; 422/207

[56] References Cited

U.S. PATENT DOCUMENTS

| | | | |
|---|---|---|---|
| 2,971,830 | 2/1961 | Kartie et al. | 48/206 |
| 4,157,244 | 6/1979 | Gernhardt et al. | 48/62 R |
| 4,569,680 | 2/1986 | Darling et al. | 48/77 |
| 4,610,697 | 9/1986 | Darling et al. | 48/77 |
| 4,773,917 | 9/1988 | Morihara et al. | 48/77 |
| 4,802,894 | 2/1989 | Usami et al. | 48/67 |
| 4,874,037 | 10/1989 | Papst et al. | 48/77 |
| 4,950,308 | 8/1990 | Lang et al. | 48/77 |
| 4,973,337 | 11/1990 | Jokisch et al. | 48/128 |
| 5,445,658 | 8/1995 | Durifeld et al. | 48/77 |

FOREIGN PATENT DOCUMENTS

| | | | |
|---|---|---|---|
| 57-148179 | 9/1982 | Japan . | |
| 58-2584 | 1/1983 | Japan . | |
| 58-2585 | 1/1983 | Japan . | |
| 58-120686 | 7/1983 | Japan . | |
| 0135285 | 8/1984 | Japan | 48/77 |
| 0065094 | 4/1985 | Japan | 48/77 |
| 62-64750 | 4/1987 | Japan . | |
| 3-239797 | 10/1991 | Japan . | |
| 3239797 | 10/1991 | Japan . | |

OTHER PUBLICATIONS

"Overvie of Experience With the Shell Coal Gasification Process" by P.L. Zuideveld et al Materials at High Temperature, vol. 11, Nos.1-4 1993.

"Experience from the Prenflo Plant" by W. Schellberg, et al; Materials at High Temperatures vol. 11, Nos. 1-4 1993.

*Primary Examiner*—Timothy McMahon
*Attorney, Agent, or Firm*—Antonelli, Terry, Stout, & Kraus, LLP

[57] ABSTRACT

A coal gasifier has an inner wall surface made by metal of an inlet part of a heat recovery vessel, the inlet part having a inner cooling mechanism, and gas for peeling deposits on the inner wall surface is injected from plural gas injection holes, the injected gas forming a slewing flow and further being intermittently increased. And at least one cooling medium injection nozzle is provided at a side wall in the upper part of a gasification chamber.

5 Claims, 5 Drawing Sheets

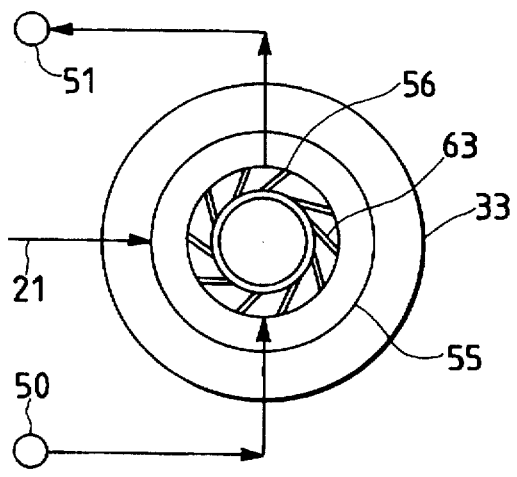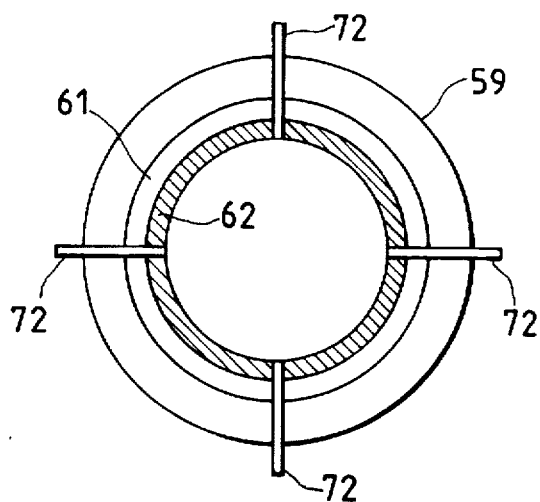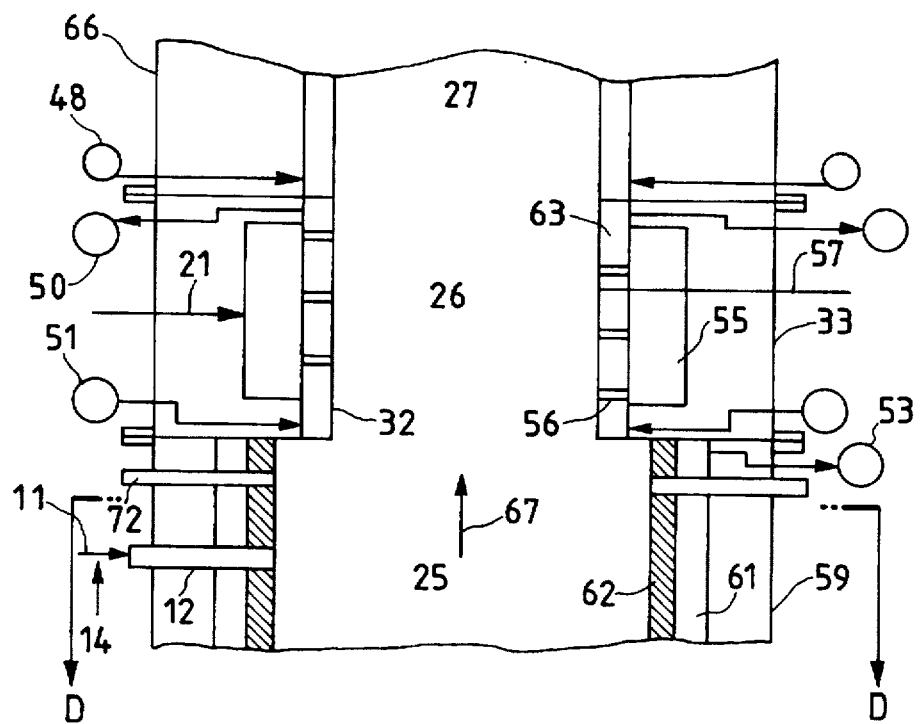

COAL GASIFIER AND USING METHOD THEREOF

This application is a Continuation application of application Ser. No. 08/418,450, filed Apr. 7, 1995 now abandoned.

BACKGROUND OF THE INVENTION

1. Field of the Invention

The present invention relates to a coal gasifier for gaining inflammable gas by feeding coal and gasification agent (oxidization agent), and carrying out the interaction of them, particularly to a coal gasifier suitably applied to an entrained bed type powdered solid gasifier. The gasifier by the present invention is capable of preventing such material as ash, etc. from adhering to an inlet part of a heat recovery vessel of a gasifier and easily peeling deposits on the inlet part.

2. Description of the Related Art

Since an entrained bed type gasifier of gasifying coal by the temperature more than the fusion temperature of ash can efficiently produce hydrogen gas and carbon monoxide gas, many kinds of entrained bed type gasifiers are developed for producing synthetic gas or fuel gas.

The most severe subject in stable operations of an entrained bed type gasifier is to prevent ash, char, or fly ash which are formed in a reaction part of a gasifier together with inflammable gas, from adhering and piled up at an inlet part of a heat recovery vessel, further from blockading the inlet part.

Generally, an entrained bed type gasifier has a cylindrical gasification chamber, a heat recovery vessel and a slag cooling chamber, following the gasification chamber. In the gasification chamber including, coal powder and oxidization agent are sprayed so as to form a flow slewing on the vertical axis of the chamber. Since the centrifuging force of gas flow and the pressure added to the gas flow are balanced by forming the slewing flow, a negative pressure zone near the center axis is generated and a large pressure difference is formed between the zone near the enter and a wall of the gasification chamber. Then, the gas flows downward at the neighborhood of the wall and upward at the zone near the center. By the upward flow formed at the zone near the center, coal ash, char and fused ash produced in the gasification chamber flows into the latter part of the chamber together with the inflammable gas produced in the chamber.

Therefor, it is impossible to prevent coal ash, char, etc. from scattering from the gasification chamber by 100%. The scattering of coal ash, char, etc. is generated not only in the entrained bed type gasifier but also in any type gasifier.

Usually, when coal reacts on oxidization agent (oxygen, air, and steam) in a gasification chamber as a reaction part of a gasifier, cinder of ash and char are always produced in a gasifier and a combustion apparatus using such powder fuel as powder coal, as raw material. Ash and char are cooled in a heat recovery vessel provided over the reaction part of a gasifier and the char generated in the gas is drawn back by a dust catcher. Ash and char, etc. receive thermal hysteresis under the conditions of high temperature and high pressure and turn to fly ash of $\phi$ several nm particles adhering mainly to the inlet of a heat recovery vessel. The fly ash adhesion to the inlet is caused, for example, by the secondary flow of fly ash and the formed gas or the high environment temperature of 1400° C. The places to which dust or char is apt to adhere are such a place as causes a pulsating flow and an irregular flow, as has a projection such as a thermocouple, or as generates a stagnant flow.

Therefor, unless ash and char generated in a reaction part of a gasifier is prevented from adhering to the inlet part of a heat recovery vessel, the stable and long period operations of a gasifier can be hardly attained.

Conventionally, several methods are reported as to prevention of deposits to a wall of a gasifier. However, only a few methods, besides Japanese Patent Application Laid-Open No. 239797/1991, of removing deposits on an inner wall of a heat recovery vessel of a gasifier are reported. In the following, are explained the conventional method for suppressing deposits to a combustion reactor and the latter part of the reactor or peeling the deposits.

Method 1:

The method prevents coal ash, slag, etc. from adhering to a wall surface of a heat recovery vessel by installing a gasification part of an entrained bed and a heat recovery part of a fluidized bed together. In the method, a fluidized bed is provided in a cylindrical space of a heat recovery part over a gasification part of an entrained bed, and the diameter of a connection part between the entrained bed part and the gasification part is designed so that the velocity of coal gas rising through the connection part is faster than the terminal velocity of particles having an average diameter in the fluidized bed. By the above constitution, particles of the fluidized bed do not fall into the gasifier through the connection part, and coal ash, slag, etc. are prevented from adhering to a heat transfer surface of the heat recovery part since the particles contact with a surface of the wall of the connection part and the heat recovery part of the fluidized bed. The method is described in Japanese Utility Model Laid-Open 64750/1987. However, the method has the following problems.

The amount of the generated gas is changed by changes of load, which changes the velocity of gas flowing through the connection part between the gasification part of the entrained bed and the fluidized bed part, and the terminal velocity of particles in the fluidized bed. Then, the particles having the velocity slower than the terminal velocity fall into the gasification part of the entrained bed, which makes it difficult to form a stable fluidized bed and affects on states of gas in the gasification part of the entrained bed to cause an unstable gasifying operations.

Further, if coal ash, slag, etc. enter the heat recovery part, the coal ash, the slag, etc. adhere to the flowing particles and the flowing particles grow up, and the excess growth of the flowing particles makes motion of the whole bed slow, which ultimately makes the formation of the fluidized bed difficult.

Furthermore, in the method, the connection part between the gasification part of the entrained bed and the fluidized bed is apt to be blockaded since the scattered coal ash, the char, the slag, etc. adhere to the inlet part of the connection part before they enter the heat recovery part.

Method 2:

In the method, deposits of carbon are removed from an inner wall of a rising tube of a coke oven or a wall of a heat exchanger by injecting the pressurized gas in a pressurized gas injection apparatus. The method is described in Japanese Patent Application Laid-Open No. 120686. The described method is to moves a pressurized gas injection apparatus upward and downward in a heat exchanger and to inject gas of high pressure to the deposits of carbon, burn the deposits of carbon and blow off the weakened deposits with air of high pressure. The method has the following problems.

Under the conditions of high temperature and high pressure, the seal structure of a connection part of the upward and downward motion mechanism and the heat exchanger becomes complicated and the danger of gas leak from the seal should be considered. Further, melting of the pressurized gas injection apparatus itself probably occurs since it is inserted into a high temperature zone.

Method 3:

By the method, deposits on an inner wall of a kiln body are removed by providing water cooling pipes at a body of a rotary kiln and cooling the deposits on the inner wall to soften the deposits so that the deposits are naturally peeled from the inner wall. And formation of deposits on the inner wall is prevented by cooling the whole inner wall to decrease the temperature of the wall to less than the softening point of raw material. The method is described in Japanese Patent Applications Laid-Open No. 2585/1983 and No. 148179/1982. The method has the following problems.

It does not easily occur only by cooling the wall that the deposits are naturally peeled, unless a means for peeling the deposits is provided. In the method, the water cooling tubes are installed in the fire-resistance wall for decreasing the temperature of the wall surface. However, the peeling of the deposits is difficult even if the temperature of the wall surface is largely decreased, since the adhesion force of the deposits is strong when slag or clinker adheres to the wall.

Method 4:

The method arranges radially tubes each of which has a nozzle for injecting water of high pressure, in a kiln body, and easily removes deposits on an inner wall of the kiln body by using the tubes. The method is described in Japanese Patent Application Laid-Open No. 148179/1982. The method has the following problems.

In the method, the nozzles are inserted into the kiln body after its operations are stopped, if deposits are detected in the body, and the deposits are compulsorily peeled from the wall by injecting water of high pressure to the deposits by using the nozzles for giving thermal shock and water hammer force. However, the method is not suitable to long period operations since applying of the method needs the stop of operations of a kiln. Further, since a kiln body rotates, the connection between the nozzles and a cooling water line is complicated.

SUMMARY OF THE INVENTION

Objects of the Invention

The present invention has been achieved in consideration of the above-described problems, and is aimed at providing a coal gasifier capable of preventing coal ash, char, slag, etc. from adhering to an inlet part of a heat recovery vessel and easily peeling the deposits from the inlet part.

Methods Solving the Problems

One of features of the present invention devises a coal gasifier having a cylindrical gasification chamber at which a plurality of burners for injecting and burning the mixture of coal and gasification agent are provided at a side wall of the gasification chamber in the tangential direction of the side wall, a slag cooling chamber provided under the gasification chamber via a slag tap, and a heat recovery vessel, provided over the gasification chamber, for cooling gas generated in the gasification chamber and drawing back heat, the gasifier comprising:

an inner wall cooling mechanism, wherein an inner wall of the heat recovery is made by metal and cooled by circulating cooling medium in the inner wall; a plurality of gas injection holes for peeling deposits on the inner wall, the gas injection forming a slewing gas flow; and at least one cooling medium injection nozzle for cooling inflammable gas generated in the upper part of the gasification chamber.

Another feature of the present invention devises a coal gasifier comprising:

a means for reducing and peeling deposits of coal ash, char, slag, etc. by cooling a gasifier formation gas near at an inlet part of a heat recovery vessel to a temperature lower than a softening temperature of coal ash, etc.; an inner wall surface made by metal of the inlet part of the heat recovery vessel, being exposed to inner environment of the inlet part, which is cooled below 400° C. by circulating cooling medium by high pressure steam or high pressure water in the inner wall, wherein a plurality of peeling gas injection holes are provided at the inner wall surface of the inlet part of the heat recovery vessel in a tangential direction of the surface, for generating a slewing gas flow and intermittently increasing injection flow of the generated gas and pressurized steam from the peeling gas injection holes and compulsorily peeling deposits on the inner wall surface of the inlet part of the heat recovery vessel; and means for cooling the inflammable gas generated in the gasification camber by injecting cooling medium from the side wall in the upper part of a gasification chamber.

Further, another feature of the present invention devises a coal gasifier having a gasification chamber, a slag cooling chamber and a heat recovery vessel, the coal gasifier comprising:

a plurality of cooling medium injection nozzles being provided at the upper part of the gasification chamber, the injection nozzles injecting pressurized steam or gas generated in the gasification chamber for cooling inflammable gas and reducing the temperature of inflammable gas entering an inlet part of the heat recovery vessel to a softening temperature of coal ash; the heat recovery vessel preferably having two-piece structure of the inlet part and a heat recovery body, the inner wall surface of the inlet part having no lining being directly exposed to inner environment of the inlet part and having a smooth surface without unevenness, and the temperature of the inner wall surface of the inlet part being reduced to the temperature less than 400° C. by feeding cooling medium of pressurized steam or pressurized water for cooling the inner wall surface of the inlet part from a feeding line different from a line of cooling medium for the heat recovery body and by independently controlling flow rate of the cooling medium; and a plurality of peeling gas injection holes being provided at the inner wall surface of the inlet part in the tangential direction of the surface and generating a slewing gas flow of the peeling gas of recycled gas or pressurized steam; and thermocouples and pressure difference sensors for measuring the pressure difference between a gasification chamber and the heat recovery body being provided at the inlet part of the heat recovery vessel, the measured temperature and the measured pressure difference being respectively compared with the respective preset value (a standard temperature and a standard pressure), and deposits on the inner wall surface of the inlet part being peeled by intermittently increasing or decreasing the peeling gas flow injected from the plurality of the peeling gas injection holes based on the results of the comparing of the measured temperature and pressure difference and the respective preset values.

In the present invention, the temperature of inflammable formed gas at the inlet part of the heat recovery vessel is reduced to the temperature less than the softening temperature of coal ash, and the metal surface of the inlet part of the heat recovery vessel is exposed to inner environment of the inlet part, and the metal surface is cooled to the temperature less than 400° C. by cooling the metal surface from the inside of the inlet part. And a plurality of peeling gas injection holes are provided in the tangential direction of the metal surface, and generate a slewing flow of the peeling gas, and the deposits are peeled by intermittently increasing or decreasing the slewing gas flow.

The temperature in the gasification chamber rises to 1600° C. as coal reacts on oxidization and generates heat. Then, ash component of coal is fused and becomes fused ash (referred to slag), and char containing carbon which is not burned yet is produced. The slag freely falls in the gasification chamber, and is rapidly cooled and solidified in a slag hopper filled up with water, and drawn back. The ash and the char flow into the heat recovery vessel together with the formed gas. Conventionally, since the temperature of the inlet part of the heat recovery vessel is usually the high temperature of 1500° C. in operation states, the deposits piled up on the inlet part of the heat recovery vessel receives thermal hysteresis and becomes ash and solidified.

Therefor, in the present invention, the heat recovery vessel has a two-piece structure of a heat recovery body and the inlet part so that dismantling inspection or exchange of the heat recovery vessel is easily carried out. Then, a plurality of nozzles for injecting inflammable gas are provided at the upper part of the gasification chamber, and a mechanism of the inner wall of the heat recovery vessel is also improved. That is, the metal surface without fireproof lining of the inlet part of the heat recovery vessel is exposed to inner environment of the inlet part, and the metal surface is cooled to the temperature less than 400° C. by cooling the metal surface from the inside of the inlet part. As a means for monitoring states of deposits, the temperature of the inlet surface and the pressure loss at the inlet part are measured by providing thermocouples at the inner wall of the inlet part the heat recovery vessel and pressure difference sensors between the gasification chamber and the heat recovery vessel. Then, the measured data are stored in a data collecting device and sent to a deposits peeling control device from the data collecting device. Each of the temperature data and the pressure difference data is compared with each of the preset values. If the discrepancy between the measured temperature and the preset value for the temperature or the measured pressure difference and the preset value for the pressure difference is positive, the deposits are judged to grow up and valve control signals are transmitted to a peeling gas (the gas formed in the gasifier or high pressure steam) control valve for intermittently injecting the peeling gas by the velocity more than 12 m/s from the injection holes. After the surface temperature and the pressure difference returns back to the respective preset value, the deposits peeling control device sends a signal for stopping the deposit peeling operations to the peeling gas control valve and sets the opening of the valve so as not to blockade the injection holes, and the coal gasifier is steadily operated.

BRIEF DESCRIPTION OF THE DRAWINGS

FIG. 2 is a horizontal sectional view taken along a line A—A of FIG.1.

FIG. 3 is a enlarged sectional view of an inlet part of a heat recovery vessel shown by FIG. 1.

FIG. 4 is a horizontal sectional view taken along a line D—D of FIG. 3.

DETAILED DESCRIPTION OF THE EMBODIMENTS

Hereinafter, details of the present invention are explained based on embodiments referring to drawings.

Figure 1:
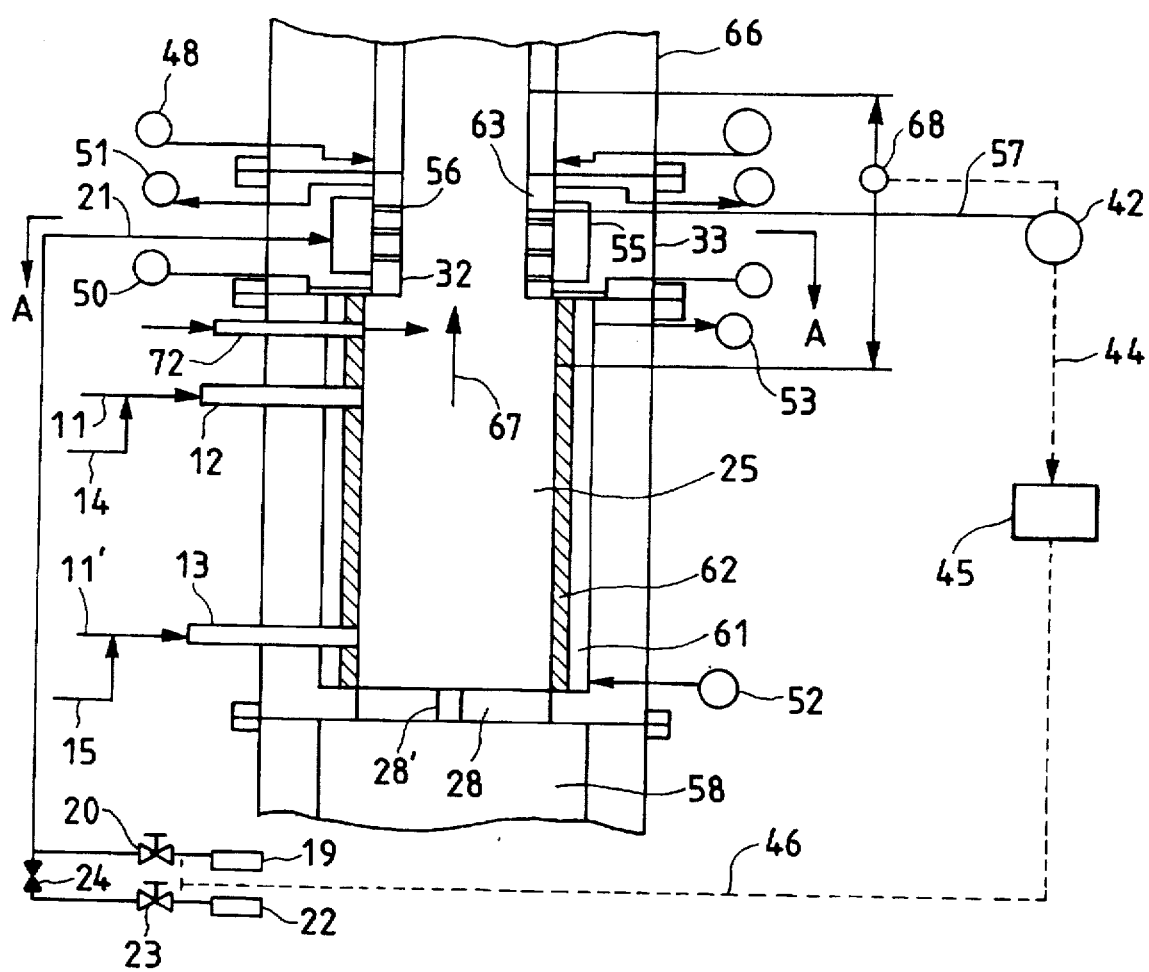
FIG. 1 is a sectional view showing a constitution of an embodiment of a gasifier by the present invention.

FIGS. 1 and 2 are sectional views showing a constitution of an embodiment of a gasifier having plural cooling medium injection nozzles 72 for reducing the temperature of inflammable gas flowing into an inlet part 33 of an heat recovery vessel, a flow pass 63 for circulating cooling medium in order to reduce the temperature of an inner wall surface of an inlet part of a heat recovery vessel, being provided in the inlet part, and plural deposits peeling gas injection holes. FIG. 2 is a horizontal sectional view taken along a line A—A of FIG. 1.

FIG. 3 is a enlarged sectional view of the inlet part of the heat recovery vessel shown by FIG. 1. And FIG. 4 is a horizontal sectional view taken along a line D—D of FIG. 3.

Usually, powdered coal flowing into a gasification chamber is carried with such carrier gas as nitrogen gas, air, carbon dioxide, etc. from the places shown by arrows 11, 11' and injected into a gasifying reaction part, namely, a gasification chamber 25, from coal burners 12 and 13. The coal burners are provided at two stages of the upper part and the lower part of the chamber. Both of the coal burner 12 at the upper part and the coal burner 13 at the lower part are provided in the tangential direction of a wall surface of the gasification chamber. Oxidization agent is fed to the coal burners 12 and 13 from the places shown by arrows 14 and 15, and mixed with the carried powder coal at the tops of the outlet parts of the burners.

An inner wall of the gasification chamber 25 is a fireproof wall 62 lined with fireproof material, and a pressurized steam flowing path for cooling the gasification chamber from its inside is provide in the fireproof wall. The pressurized steam flows into a pipe 52 and away from a pipe 53. Then, the gasifier is composed of the gasifying reaction part (gasification chamber) 25, a slag cooling part (slag cooling chamber) 58, the inlet part of the heat recovery vessel 33 and the heat recovery body 66.

The powder coal reacts on the oxidization agent (air or oxygen) in the gasification chamber 25 and it is inverted to inflammable gas rich with hydrogen and carbon monoxide. After the formed inflammable gas 67 flows away from the gasification chamber, it flows into the inlet part 33 of the heat recovery chamber over the upper part of the gasification chamber and it is carried into a gas refining system including an apparatus such as a dust catcher, via the heat recovery body 66. The dust catcher is preferably realized by a cyclone structure.

On the other hand, coal ash fused in the gasification chamber (referred to slag) flows down on the inner wall of the gasification chamber 25, and falls into a slag cooling chamber 58 through a slag tap hole 28' provided at the center of a slag tap 28, and it is carried into a slag recovery chamber 30.

Conventionally, in any type of a gasifier, if powder coal is mixed with oxidization agent (air or oxygen) at the tops of the outlet parts of the coal burners 12 and 13 and gasified under the high temperature more than 1600° C. particles exposed in high temperature gas receives thermal hysteresis and becomes coal ash, char or fly ash which are carried into the heat recovery vessel from the gasification chamber, and cooled by drawing back its heat. In the above process, a part of the coal ash, the char, the fly ash, etc. adheres to the inner wall of the heat recovery vessel.

The cooling medium injection nozzles 72 provided at the upper part of the gasification chamber, inject pressurized steam or formation gas from the gasifier in the direction shown by a arrow in FIG. 1. The formation gas is the gas flowing away from the gasifier and being refined in the gas refining system. Such peeling gas as the formation gas or the pressurized steam is flowed through a line 21 and a peeling gas flow path 55, and fed to and injected from the peeling gas injection holes 56, in order to peel the deposits on the inner wall surface of the inlet part of the heat recovery vessel. And pressurized steam or water is fed to the cooling medium flow path 63 from a pipe 50, and discharged to a pipe 51, in order to cool the inner wall surface 32 of the inlet part of the heat recovery vessel. The temperature data detected by a thermocouple 57 attached at the inner wall surface of the inlet part of the heat recovery vessel, and the pressure difference data detected by a pressure difference sensor 68 at the inlet part of the heat recovery vessel, are transmitted to a data collection device 42 and sent to a means for generating signals for controlling the peeling gas flow 45.

Figure 6:
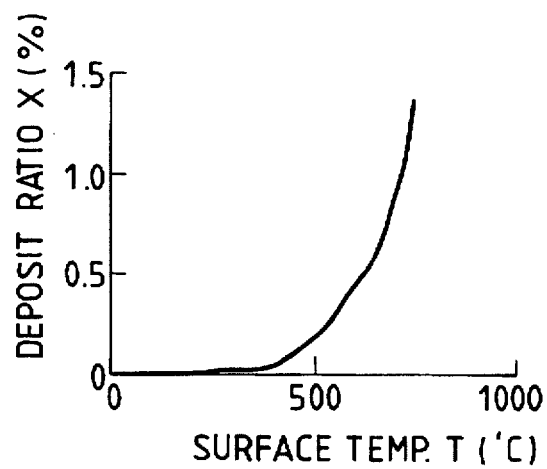
FIG. 6 shows a relation between the temperature of an inner wall surface of the inlet part of the heat recovery vessel and the deposits on the inner wall surface.

The heat recovery vessel has a two-piece structure of a heat recovery body 66 and the inlet part 33 so that dismantling inspection or exchange of the heat recovery vessel is easily carried out. By the above-mentioned two-piece structure, since the flow rate of the pressurized steam or the water circulating in the cooling medium flow path 63 is independently controlled, the inner wall surface temperature of the inlet part of the heat recovery vessel can be freely and adequately adjusted. There are few reports on the effects of the inner wall surface temperature on the deposits of coal ash, etc. Then, by using a hot model, the effects of the wall surface temperature of the heat recovery vessel on the adhesion ratio were tested. The test results are shown in FIG. 6. In the figure, the abscissa indicates the wall surface temperature (°C.) and the ordinate the adhesion ratio. The definition of the adhesion ratio is shown in the following.

Adhesion ratio=Amount of deposits on inner wall of inlet part of heat recovery vessel/

Amount of fed ash×100 (wt %)     (1)

Figure 7:
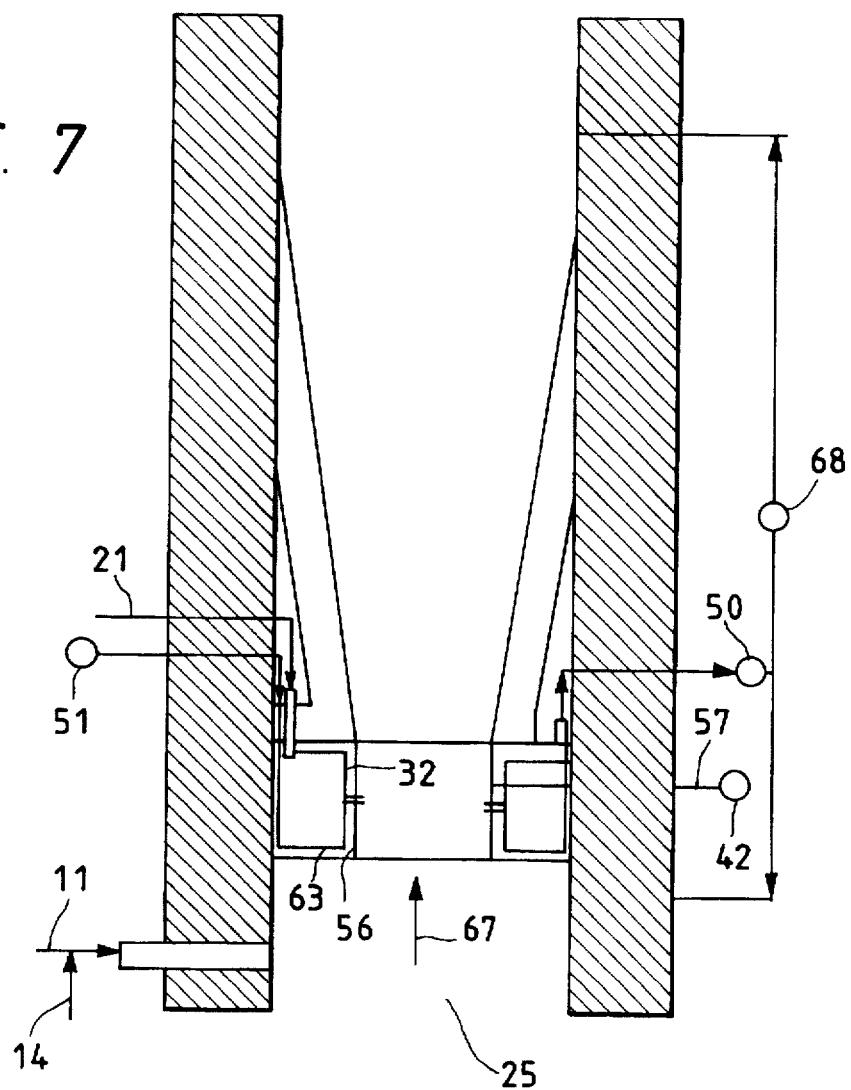
FIG. 7 is an outline sectional view of a hot model.

In FIG. 7, an outline sectional view of the hot model is shown. The conditions of the test are as follows: the inner diameter of a gasifying reaction part is 300 mm, the inner diameter of an inlet part of a heat recovery vessel is 120 mm, the gas velocity at the inlet part of the heat recovery vessel is 4.5 m/s, the flow rate of cooling gas (inert gas) at the inlet part of the heat recovery vessel is 9 Nm$^3$/h, the flow rate of the fed ash is 8 kg/h, the temperature in the gasifying reaction part is 1500° C., and the test environment pressure is atmospheric pressure. Then, the inner wall surface of the inlet part of the heat recovery vessel is a metal surface. The wall surface temperature of the inlet part 33 of the heat recovery vessel is changed by changing the flow rate of cooling medium circulating in the inlet part 33 of the heat recovery vessel. By examining the test results, in the wall surface temperature of 700° C., the adhesion ratio is 1.5 wt % and the thickness of the lump layer state deposits adhering to the wall is 5 mm. The adhesion grade of the deposits is such a weak one that the deposits can be peeled by pushing it with a finger. In the wall surface temperature of 400° C., the adhesion ratio is 0.005 wt % and the thickness of the powder state deposits is 0.1 mm. And the adhesion grade of the deposits is such a very weak one that the deposits are peeled by touching it with a finger. From the above-mentioned results, it is clear that the amount of the deposits adhering to the wall surface is greatly decreased and the adhesion grade of the deposits is also considerably weakened, by setting the wall surface temperature less than 400° C. The above results were obtained by feeding the gas for cooling the inlet part of the heat recovery vessel by 9 Nm$^3$/h and cooling the formation gas at the inlet part of the heat recovery vessel from 1400° C. to 1200° C. In case the cooling gas is not fed to the neighborhood of the inlet part of the heat recovery vessel, since the temperature of the formation gas is the high temperature of 1500° C., the adhesion grade of the deposits is so a little stronger, compared with the case of cooling the formation gas, that the deposits are peeled by pushing it with a finger. Further, in case the wall of the inlet part is made with fireproof material and not cooled, if slag, etc. adheres to the high temperature wall of 1400° C., the wall is eroded by the slag, etc. and the deposits adheres to the wall so very strongly that even strike on it can not peel it.

Figure 8:
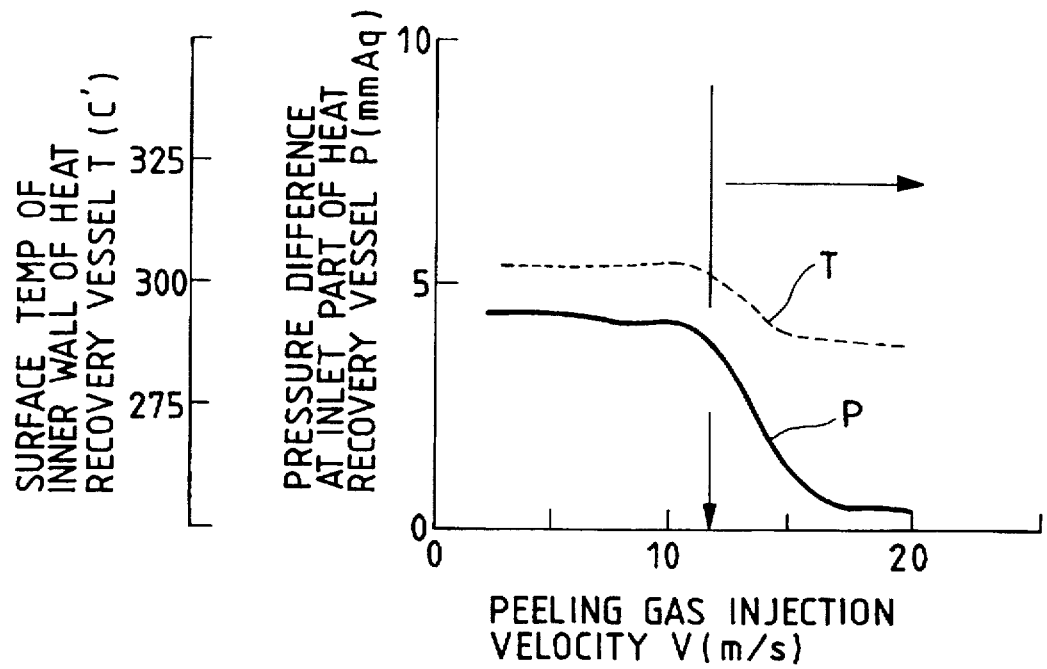
FIG. 8 is a graph showing relations between the peeling gas injection velocity, and the temperature of the inner wall surface and the pressure loss at the inlet part of the heat recovery vessel.

From the above result, at the inlet part 33 of the heat recovery vessel, the following structure is provided. That is, the formation gas 67 produced in the gasification chamber is cooled to the temperature less the softening temperature of ash in powder coal, at the neighborhood of the inlet part 33 of which the surface is made by metal, and the surface temperature of the wall surface 32 is reduced to 400° C. by circulating cooling medium such as pressurized steam or water in a cooling medium flow path 63 of the inlet part 33. Furthermore, since the adhesion grade of the deposition is very weak under the conditions of the inner surface temperature less than 400° C. of the inlet part of the heat recovery vessel, it can be considered that peeling the deposits is possible by injecting the peeling gas along with the circumferential direction of the inner wall surface of the inlet part 33. Then, it was tested how high velocity of the peeling gas can peel the deposits on the inner wall surface. Twelve peeling gas injection holes of 1.5 mm diameter were provided in the tangential direction of the inner wall surface of the hot model shown by FIG. 7. The conditions of the test are as follows: That is, the slewing diameter of the peeling gas is 100 mm, the surface temperature of the inner wall is 280° C., and the other test conditions are the same as the ones of the previous test. The results of the test are shown in FIG. 8. The abscissa indicates the peeling gas velocity V (m/s), and the two ordinates the pressure difference at the inlet part of the heat recovery vessel P (mmAq) and the surface temperature of the inner wall T (°C.), respectively. As shown in FIG. 8, when the injection velocity of the peeling gas is gradually increased, the deposit peeling is started from the injection velocity V of 12 m/s and the pressure difference decreases almost to 0 mmAq from 4.5 mmAq at the stating point, at the injection velocity of 17 m/s. The surface temperature T decreases to the preset temperature of 280° C. from 305° C. From the above results, it is proved that the deposits can be easily peeled by feeding a slewing gas flow and increasing the peeling gas injection velocity over 12 m/s. Further, by setting the angle of the peeling gas injection holes to the upward angle of 45° and the downward angle of 45° besides the horizontal angle, almost the same test results can be obtained.

Usually, if there are not deposits on the inner wall surface 32 of the inlet part of the heat recovery vessel, the temperature detected by the thermocouple 57 for monitoring the wall surface temperature and the pressure loss detected by the pressure difference sensor 68 at the inlet part of the heat recovery scarcely change. However, if the deposit adhesion begins, the indications of the thermocouple 57 and the pressure difference sensor 68 increase. The measured data by the thermocouple 57 and the pressure difference sensor 68 are always taken in the data collection device 42 from which the control signals 44 are sent to the means for controlling the peeling gas flow rate 45. In the means for controlling the peeling gas flow rate 45, it is judged that there are the deposits on the inner wall surface if the measured values by the thermocouple 57 and the pressure difference sensor 68 are compared with the preset values and the measured values exceed the preset values. Then, control signals 46 are transmitted to a gasifier formation gas flow control valve 20 and a pressurized steam flow control valve 23, and the peeling gas flow injected from the peeling gas injection holes is intermittently increased and then the slewing flow is generated. The numeral 19 indicates a gasifier formation gas tank and the numeral 22 a pressurized steam generator. If the measured values by the thermocouple 57 and the pressure difference sensor 68 come near to the preset values, the means for controlling the peeling gas flow rate 45 judges that the deposits are peeled, and sends a signal for stopping the peeling operations to the peeling gas flow control valve 20 or 23 and sets the opening of the valve so as not to blockade the peeling gas injection holes 56, and the coal gasifier is steadily operated.

Further, since the temperature of the inflammable gas flowing into the inlet part of the heat recovery vessel becomes higher than 1400° C. by a conventional gasification method, char, etc. adheres to and is piled up on the inner wall surface of the inlet part of the heat recovery vessel, and further receives thermal hysteresis and becomes to ash or slag, which makes the stronger adhesion grade of the deposits. Therefor, it is necessary to reduce the temperature of the gasifier formation gas in advance besides reducing the inner surface temperature of the heat recovery vessel. From the previously mentioned test results, it is proved that the inner surface temperature of the inlet part of the heat recovery vessel is easily decreased to the temperature less than 400° C. by providing the cooling medium injection nozzle 72 at the neighborhood of the inlet part of the heat recovery vessel in the upward side of the gasifying reaction part and injecting the cooling medium such as pressurized steam or the gasifier formation gas. The velocity of the cooling medium injected from the cooling medium injection nozzle is set so as not to impede the flow of the gas formed in the gasifying reaction part.

Figure 9:
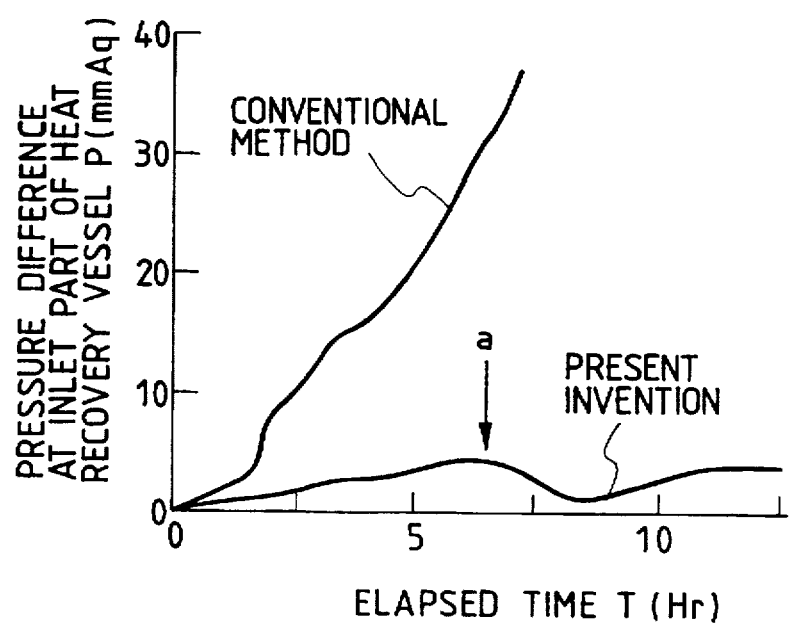
FIG. 9 is a graph showing relations between the elapsed time, and the pressure loss by a conventional method and the temperature by the present invention, at the inlet part of the heat recovery vessel.

Then, by using the previously mentioned hot model, a test of deposits peeling effects was carried out for the structure used in the conventional heat recovery vessel of which the inner wall surface of the inlet part is lined with fireproof material and the structure by the present invention of which the inner wall surface of the inlet part is made by metal and which has an inside cooling mechanism and further the deposits peeling mechanism. The results of the test are shown in FIG. 9. The abscissa indicates the elapsed time (h) and the ordinate the pressure difference (mmAq) at the inlet part of the heat recovery vessel. In the conventional structure, the pressure difference at the inlet part of the heat recovery vessel increases by 20 mmAq at the elapsed time of 5 h and only rises after the time. Then, the contracted area part of the hot model having the conventional structure was dismantled and the deposit states was inspected. The results of the inspection showed that ash and slag adhere to the contracted area part and were solidified there, and the deposits of the ash and slag could not be peeled by another means except striking on it, of which the adhesion grade was very strong. On the contrary, in the structure by the present invention, the pressure difference increases by 2 mmAq at the elapsed time 7 h, and nitrogen gas is injected at the point a shown in FIG. 9. Then, the pressure difference decreases and returns back to the preset pressure values. The adhesion grade was such a very light one that powder deposits thinly adhered to the inner wall and could be easily peeled by touching it with a finger.

Figure 5:
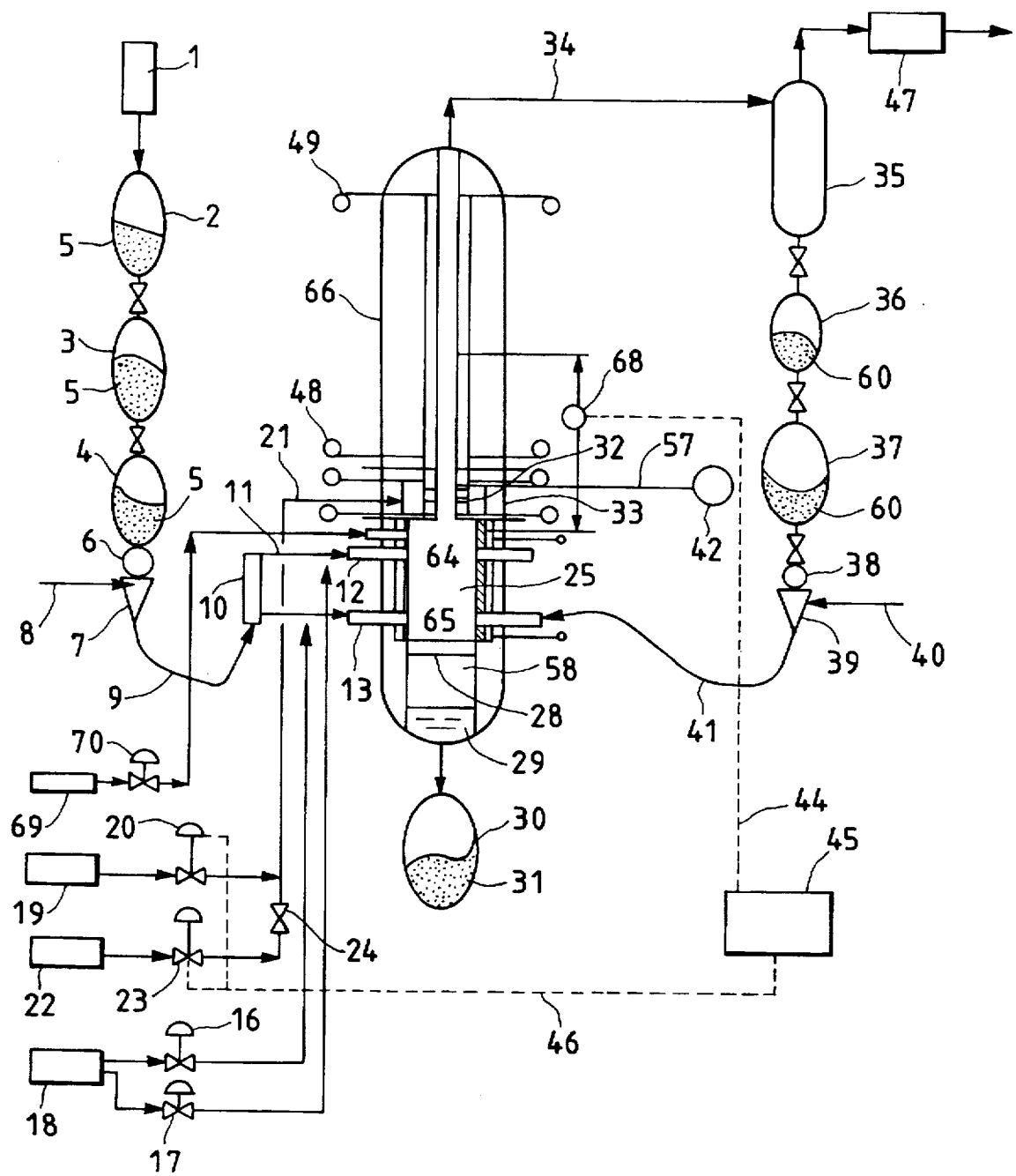
FIG. 5 shows a constitution of a gasification system including the embodiment of a gasifier by the present invention.

FIG. 5 shows the whole constitution of a gasification system including the embodiment of a gasifier by the present invention. The gasification system is composed of a coal feeding system, a oxidization agent feeding system, a gasifier and a gas refining system.

The coal feeding system consists of a crusher 1, an atmospheric coal hopper 2, an atmospheric-pressurized coal hopper 3, a coal feeding hopper 4, a coal feeding apparatus (feeder, etc.), a mixer 7, a pneumatic coal carrying line 9 and a distributer 10.

The powder coal 5 crushed by the crusher 1 is carried to the atmospheric coal hopper 2, then to the atmospheric-pressurized coal hopper 3, and then to the coal feeding hopper, which are all filled up with the powder coal. And, after the amount of the powder coal to be fed is set by the coal feeding apparatus, the powder coal freely falls and is mixed with inert gas such as nitrogen or carbon dioxide in the mixer 7. Then, the powder coal is pneumatically carried though the pneumatic coal carrying line 9 and equally distributed to plural pipes by the distributer 10, and fed to the gasifier 59 via the coal burners 12 and 13.

The oxidization agent (air or oxygen) system is composed of a oxidization agent pressurizing apparatus 18, and oxidization agent flow control valves 16 and 17. The oxidization agent sent from the oxidization agent pressurizing apparatus 18 passes through the oxidization agent flow control valves 16 and 17 and is fed to the coal burners 12 and 13 provided at the gasifier 59. Then, the oxidization agent is mixed with the powder coal 5 at the tops of the burners, and the mixture is gasified.

The gasifier 59 consists of a gasifying reaction part 25, a slag cooling part 58, a inlet part 33 of a heat recovery vessel and a heat recovery body 66.

The gasifying reaction part 25 has an upper stage reaction zone 64 and a lower stage reaction zone 65. In the upper stage reaction zone 64, a little oxygen of 0.4–0.6 wt % of coal is fed and active char is produced, and in the lower stage reaction zone 65, oxygen of about 1 wt % of coal is fed, of which the temperature is kept higher than the melting temperature of ash in coal. Plural coal burners 12 and plural coal burners 13 are provided at the upper stage zone and the lower stage zone, respectively, in the tangential direction of each zone, for making a slewing gas flow. The active char produced in the upper stage zone 64 is fed, being carried on a slewing downward flow, to the high temperature lower zone and reacts on carbon dioxide or steam, and then becomes slag of melted ash. The slag of melted ash freely falls into the slag cooling part 58 filled up with cooling water 29 through a slag tap hole and enters a slag drawing back apparatus 30 from which the cooled slag is drawn as slag of melted ash 31.

The cooling medium injection nozzle 72 communicates with a pressurized steam tank or a gasifier formation gas tank 69 and a cooling medium flow control valve 70.

The heat recovery body 66 has such a structure that its inner wall is cooled from its inside by cooling medium (pressurized steam) and the structure has a cooling medium inlet pipe 48 and outlet pipe 49.

Further, to the path for feeding the gasifier formation gas or pressurized steam as the peeling gas to the deposits peeling gas injection holes 56 provided at the inner wall surface of the inlet part 33 of the heat recovery vessel, a switching valve 24 is provided for switching between the formation gas feeding and the steam feeding.

Furthermore, the temperature of the inflammable gas formed in the gasifying reaction part is decreased to the point lower than the softening temperature of ash in coal by injecting the pressurized steam or the gasifier formation gas from the cooling medium injection nozzle 72 provided at the upper part of the gasifying reaction part 25.

The inner wall surface of the inlet part 33 of the heat recovery vessel is made with a naked metal tube without unevenness and exposed to the inner environment of the inlet part 33. And the inner wall surface is cooled from its inside by feeding cooling medium (pressurized steam or water) from tubes 50 and 51, which keeps the temperature of the inner wall surface less than 400° C. and reduces the adhesion grade of the deposits. The plurality of the peeling gas injection holes 56 are provided at the inner wall surface 32 in the tangential direction of the wall surface in order to make a slewing flow of the peeling gas. The operations of the peeling gas flow control valve based on the data measured by the thermocouple 57 and the pressure difference sensor 68 are the same as explained previously.

The gas formed in the gasifier 59 is carried to the dust catcher (cyclone, etc.) 35 via a formation gas line 34 and the gas refiner 47 where dust, char, hydrogen sulfide, etc. are removed, and then is used for fuel or raw material.

The dust drawing back system is composed of the dust catcher (or cyclone) 35, an intermediate char hopper 36, a char feeding hopper 37, a feeder 38, a mixer 39, a char carrying line 41 and a char burner 43. With the char 60 drawn back by the dust catcher 35, the intermediate char hopper 36 is filled up and the char 60 is carried to the char feeding hopper 37. Then, after the char feeding hopper 37 is filled up with the char 60 and the char amount to be fed is set by the feeder 38, the char 60 is made fall freely and mixed with inert gas such as nitrogen or carbon dioxide fed from the place shown by an arrow 40, in the mixer 39. Then, the mixture is pneumatically carried through the char carrying line 41 and turned back to the gasifying reaction part 25 via the char burner 43.

Although the entrained bed type gasifier is applied to the above-explained embodiment, the present invention is applicable to any type of gasifier.

As mentioned above, by the present invention, it is possible to prevent char, slag, etc. from adhering to the inner wall surface and to decrease the adhesion grade of the deposits of char, slag, etc. by keeping the temperature of the inflammable gas of the gasifier formation gas at the inlet part of the heat recovery vessel less than the softening temperature of ash in coal, and making the inner wall surface made by metal exposed to the inner environment, and cooling the inner wall surface from its inside with cooling medium to 400° C. And the deposits on the inner wall surface can be easily peeled by providing the plurality of the peeling gas injection holes at the inner wall surface of the inlet part of the heat recovery vessel in the tangential direction of the wall surface, and injecting the peeling gas for making a slewing flow, and increasing intermittently the injected flow rate.

The gasifier has the four-piece structure consisting of the gasifying reaction part, the slag cooling part, the inlet part of the heat recovery vessel and the heat recovery body.

Then, by the present invention, it is possible to prevent char from adhering to the inner wall surface and the deposits of char from becoming ash and slag by providing the plurality of the cooling medium injection nozzles at the upward stream side in the gasifying reaction part for cooling the inflammable gas of the gasifyier formation gas, and decreasing the temperature of the inflammable gas entering the inlet part of the heat recovery vessel less than the softening temperature of ash in coal. And the surface temperature of the inlet inner wall of the heat removal vessel can be easily kept less than 400° C. since the cooling medium flow rate can be independently controlled by making the inner wall metal surface without fireproof liner of the inlet part of the heat recovery vessel exposed in the inner environment, and feeding cooling medium for cooling the inner wall of the inlet part of the heat recovery vessel by using a feeding line different from a cooling medium flowing line for the gasifying reaction part or the heat recovery body. Furthermore, the deposits on the inner wall surface can be easily peeled by providing the plurality of the peeling gas injection holes at the inner wall surface of the heat recovery vessel in the tangential direction of the surface, and injecting the peeling gas for making a slewing flow, and increasing intermittently the injected flow rate based on the data measured by the thermocouple and the pressure difference sensor provide at the inlet part of the heat recovery vessel.

What is claimed is:

1. A coal gasifier which comprises a cylindrical gasification chamber, a plurality of burners for injecting and burning a mixture of coal and gasification agent provided on a side wall of said gasification chamber and arranged to direct the mixture in a tangential direction along said side wall, a slag cooling chamber provided under said gasification chamber via a slag tap, and a heat recovery vessel provided on said gasification chamber for cooling gas generated in said gasification chamber and for recovering heat from the generated gas, said heat recovery vessel comprising an inlet part connected to an upper outlet end of the gasification chamber and a body part connected to the inlet part;

an inner wall surface cooling mechanism for cooling surfaces of inner walls of each of the inlet part and the body part of said heat recovery vessel by circulating cooling medium in a flow path provided in each of the inner walls, the inner wall surface of the inlet part of said heat recovery vessel being made of metal;

a plurality of peeling gas injection holes provided in said inner wall surface of the inlet part and arranged to direct the injected gas in a tangential direction of said inner wall surface for peeling deposits of ash on said inner wall surface, said injected gas being intermittently injected from said plurality of peeling gas injection holes and forming a slewing gas flow within the inlet part; and at least one cooling medium injection nozzle provided in a side wall in an upper part of said gasification chamber near said outlet end for cooling the gas generated in said gasification chamber.

2. A coal gasifier according to claim 1, further including control means for controlling flow rate of said cooling medium circulating inside said inner wall of said inlet part to keep temperature of said inner wall surface less than 400° C. by detecting said temperature of said inner wall surface of said inner part of said heat recovery vessel and by using the detected temperature to regulate the flow rate.

3. A coal gasifier according to claim 1, further comprising at least one thermocouple for detecting temperature of said inner wall surface of said inlet part of said heat recovery vessel, and at least one pressure difference sensor for detecting a pressure loss at said inlet part of said heat recovery vessel, and control signal generation means for generating signals for controlling flow rate of the peeling gas intermittently injected from the plurality of said peeling gas injection holes based on the temperature and pressure data detected by said at least one thermocouple and said at least one pressure difference sensor.

4. A coal gasifier according to claim 3, further comprising a control valve for adjusting the flow rate of said peeling gas fed to said peeling gas injection holes via a pipe, wherein said temperature and said pressure loss data detected at said inner wall surface of said inlet part of said heat recovery vessel are compared with each of preset values, respectively, and said control signal generation means transmits signals for controlling said peeling gas flow rate to said control valve so that said gas flow rate of the injected gas is intermittently increased if said detected temperature of said inner wall surface exceeds said preset value for said temperature, and said detected pressure loss at said inlet part exceeds said preset value for said pressure loss; said preset values being stored in said control signal generation means.

5. A coal gasifier according to claim 1, wherein said inner wall surface of said inlet part is made of a metal tube having a smooth surface.

* * * * *